F. E. R. JONES & R. S. BARNUM.
HOSPITAL BED.
APPLICATION FILED MAR. 31, 1910.

974,495.

Patented Nov. 1, 1910.
10 SHEETS—SHEET 5.

F. E. R. JONES & R. S. BARNUM.
HOSPITAL BED.
APPLICATION FILED MAR. 21, 1910.

974,495.

Patented Nov. 1, 1910.
10 SHEETS—SHEET 6.

F. E. R. JONES & R. S. BARNUM.
HOSPITAL BED.
APPLICATION FILED MAR. 21, 1910.

974,495.

Patented Nov. 1, 1910.
10 SHEETS—SHEET 9.

THE NORRIS PETERS CO., WASHINGTON, D. C.

UNITED STATES PATENT OFFICE.

FRED E. R. JONES AND RUSSELL S. BARNUM, OF CHICAGO, ILLINOIS; SAID BARNUM ASSIGNOR TO SAID JONES.

HOSPITAL-BED.

974,495.  Specification of Letters Patent.  Patented Nov. 1, 1910.

Application filed March 21, 1910. Serial No. 550,677.

*To all whom it may concern:*

Be it known that we, FRED E. R. JONES and RUSSELL S. BARNUM, citizens of the United States, residing at Chicago, in the county of Cook and State of Illinois, have jointly invented certain new and useful Improvements in Hospital-Beds, of which the following is a description, reference being had to the accompanying drawings, forming a part of this specification, in which corresponding letters of reference in the different figures indicate like parts.

The object of our invention is to provide a hospital bed, which shall be so constructed as to enable all of the movements and positions to be attained thereby which may be found necessary by nurses and physicians for the proper care and treatment of invalids, such, for example, as means for lifting the occupant vertically while in a horizontal position, for inclining the entire body by elevating the head or foot portion, for inclining either the head or foot portion while the remainder is horizontal, for raising either the head or foot portion while the middle is lowered or for laterally tilting in either direction the part which supports the patient so that his body may be turned over with the least inconvenience to him and a minimum of manual effort on the part of the nurse.

Further objects relate to details of construction in connection with the main features, all of which is hereinafter more particularly described and definitely pointed out in the claims.

In the drawings Fig. 3ª is a detail face view of a portion of the vertical guide bar and the meeting ends of the spreader bars, the outer plate being removed.

Figures 9, 10:
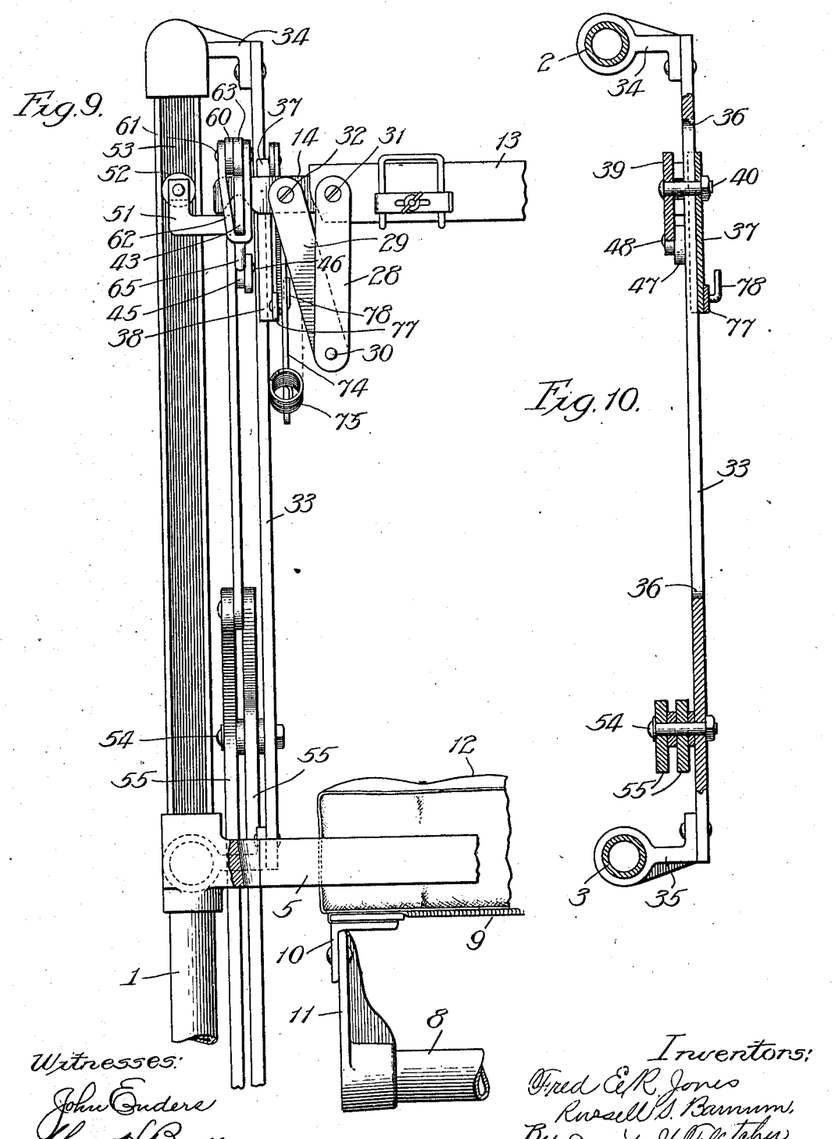
Fig. 9 is an enlarged side elevation of portions of the frame, and operating mechanism as viewed from a position indicated by the line 9—, Fig. 3.
Fig. 10 is an enlarged sectional view taken upon the line 10—10, Fig. 4, viewed in the direction of the arrow there shown.
Figures 18, 19, 20, 21:
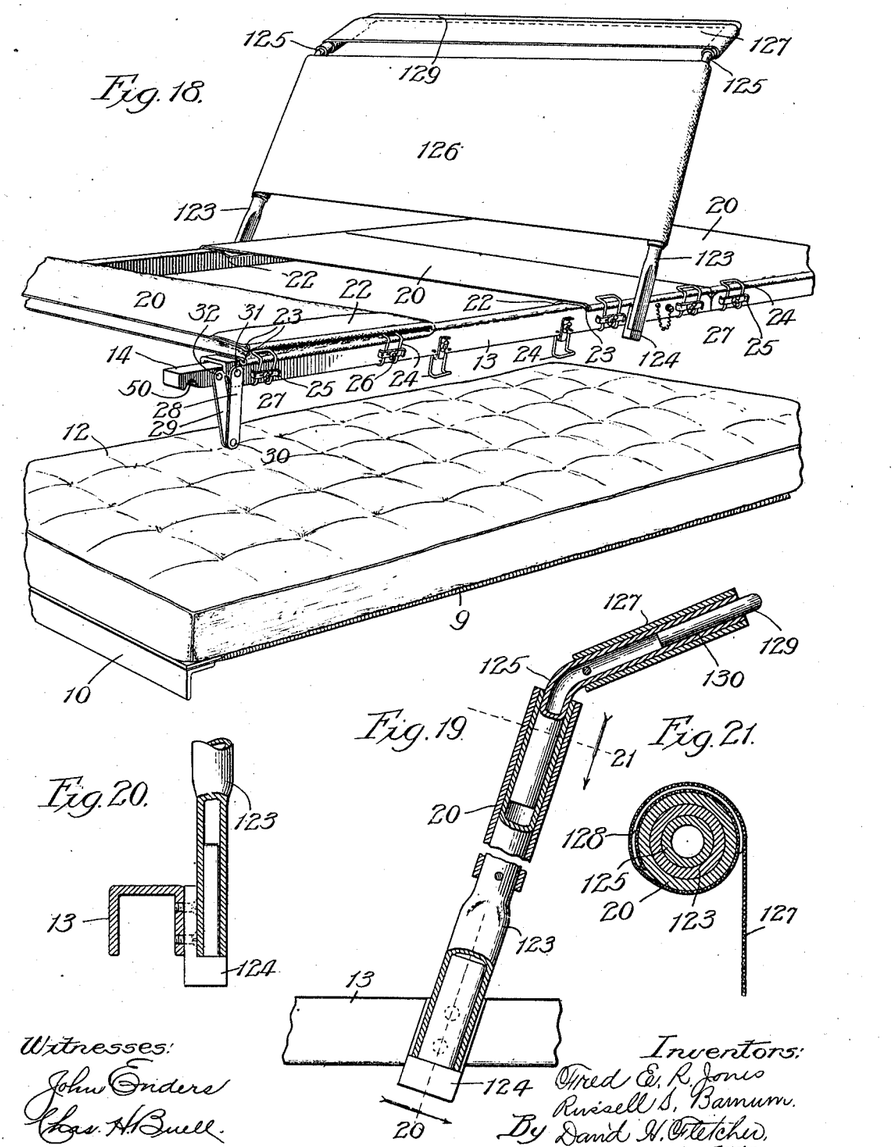
Fig. 18 is a perspective view showing the mattress with the stretcher elevated above it, the middle section of canvas removed and the back support in place.
Fig. 19 is a central vertical sectional view of one of the back-rest supporting posts.
Fig. 20 is a sectional view taken upon the line 20—, Fig. 19, viewed in the direction of the arrow there shown.
Fig. 21 is a transverse sectional view in plan taken upon the line 21—, Fig. 19, as indicated by the arrow there shown.

Referring to the drawings, 1 represents the vertical posts, 2, 3 and 4, respectively, the cross-bars connected therewith at the top, middle portion and lower parts, respectively, to form the usual rigid frames for the head and foot portions of a bed, which frame elements are jointedly connected in any well known way by means of side-rails 5, better shown in Figs. 1, 2, 9 and 11, which are preferably formed from angle iron. Hooked over or otherwise detachably connected with said side rails near their respective ends, are suspending straps 6, to the lower ends of which are connected parallel horizontal cross-bars 7 adapted to serve as supports for the usual longitudinal tubular bars 8, forming the main frame for a woven wire mattress-support 9, Figs. 2 and 9, the ends of which are stretched upon cross-bars 10, attached by means of brackets 11 to the bars 8. A mattress 12, Figs. 9 and 18, is adapted to rest upon the support 9.

The structure so far described is old and forms the basis with which to combine our several improvements, which consist generally of a canvas supporting element connected with a supplemental frame and actuating mechanism so arranged and combined as to enable the canvas which lies normally upon the mattress in an unstretched condition, to be automatically stretched and then lifted with the patient supported thereon, to any desired height or inclined at any angle to conform to specific requirements.

We will first describe the movable supplemental frame and then the mechanism for manipulating it. Located above and parallel with the stationary side rails 5, are channel bars 13, Figs. 1, 2, 6, 7, 8, 9, 11, 12 and 17 to 20 inclusive, having telescoping extensions or end-bars 14, at their respective ends, better shown in Figs. 1, 2, 6, 9, 11, 12 and 18, and indicated in dotted lines in Fig. 5, which serve as end supports for said channel-bars and provide by their telescoping action for the play necessary to produce the desired tilting movements of the latter, hereinafter described. In order to overcome friction, we provide a friction roller 15, shown in Fig. 12, and indicated in dotted lines in Fig. 11, upon the bar 14 near the end of the channel-bar 13, said roller having a horizontal axis, and having its tread upon the under face of the channel-bar, while like rollers 16, having vertical axes, are located upon the under face of a cut-away portion 17 adapted to bear laterally upon the flanges or side walls of the channel-bar. A friction roller 18 is located beneath each one of the extensions 17, being journaled upon a movable pin 19, projected through bores in the side flanges of the channel-bars. Connected with and supported by the channel-bars 13 are a series of transverse canvas strips 20 and a like strip 21, somewhat differently arranged, for a purpose hereinafter stated; said strips being shown in Figs. 4, 7, 8 and 18. In order to secure said strips in place each one is folded upon itself at the end as shown at 22, Figs. 7, 8 and 18, and a rod 23 inserted within the fold and adjusted upon the side of the channel-bar near its upper edge. A plurality of clamps, consisting preferably of bent wires 24, adapted to overlap the canvas with the inclosed rods, while gripping the lower edge of the channel-bars, are provided for securing said canvas strips in place and are rigidly fastened by means of cross-plates 25, bolts 26 extending through the channel-bars and thumb-nuts 27. This device enables the canvas to be accurately adjusted and firmly secured in place so as to bear the weight of a person thereupon without slipping. The canvas strips lie normally upon the mattress 12 and are not intended to be under tension except when the patient is to be raised thereby, for which purpose they are expressly provided. When this becomes necessary and the canvas strips are stretched, as hereinafter described, a torsional stress is placed upon the channel-bars which tends to increase the friction between them and the telescoping elements 14. In order to overcome this objection we provide links 28, 29 at each end of each channel-bar 13, better shown in Figs. 1, 2, 9 and 18, which links extend downwardly and are jointedly connected to each other at 30. The upper end of the link 28 is jointedly connected to the end of the channel-bar at 31, while the corresponding end of the link 29 is jointedly connected at 32 to the extension bar 14. Said joints are closely fitted to avoid play and serve to oppose the twisting action of the channel-bars and to enable the extensions 14 to move freely therein when the telescoping action occurs.

Figure 1:
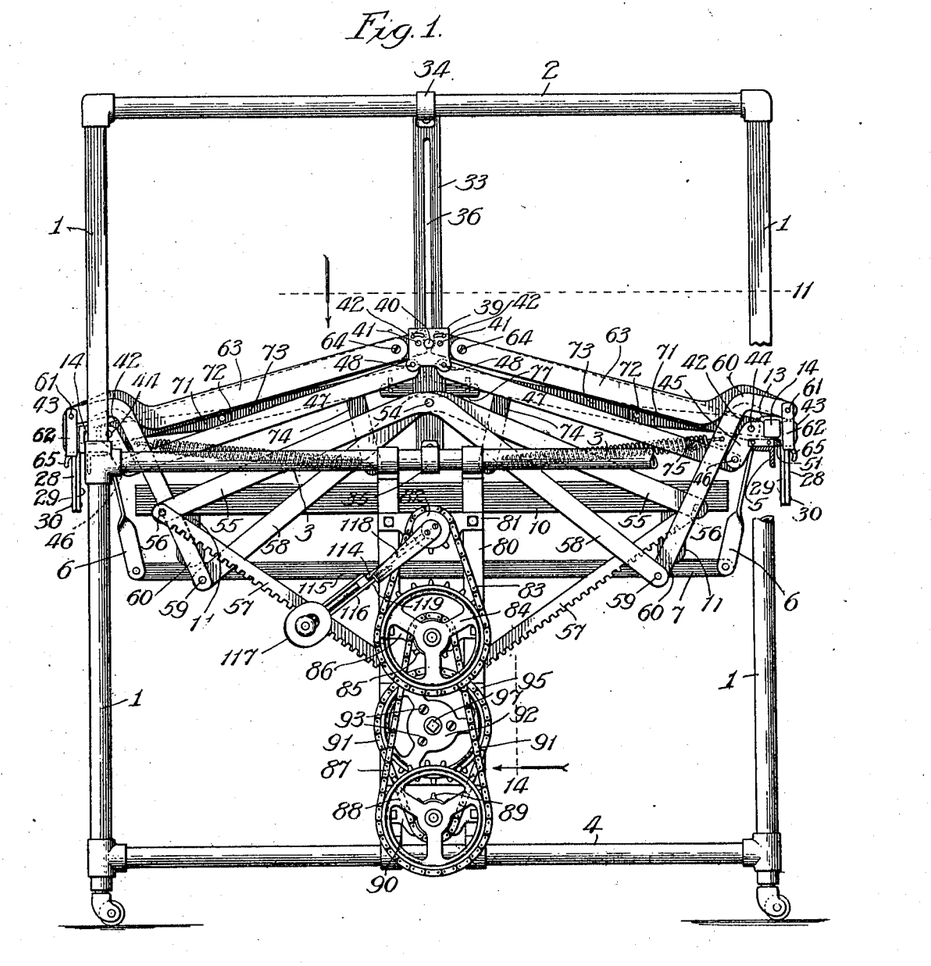
—Figure 1 is a rear elevation showing the several movable parts in their respective normal positions.
Figures 3, 3A:
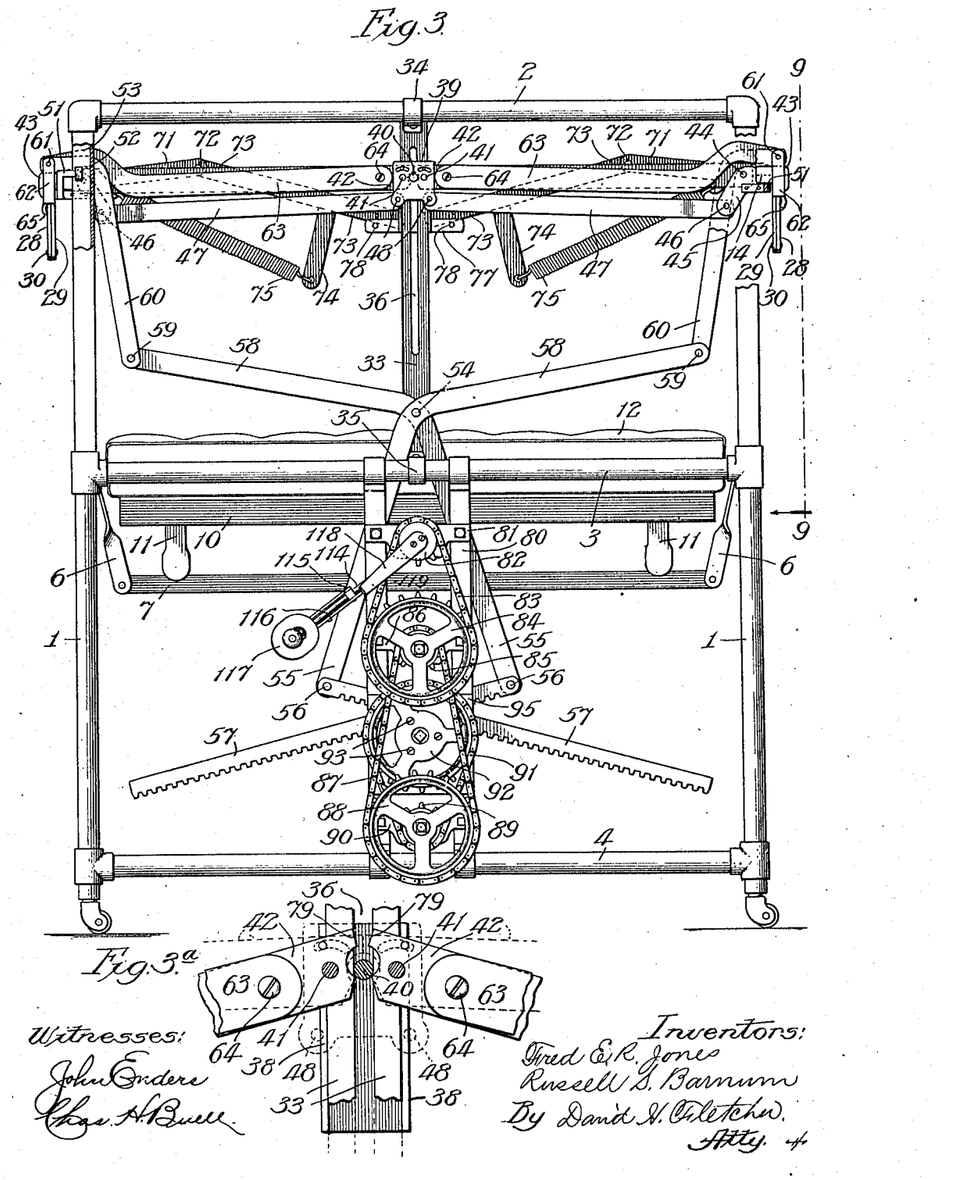
Fig. 3 is a rear elevation showing the movable parts in the positions assumed thereby when the stretcher frame is raised to its extreme height and in a horizontal position.
Figures 4, 5:
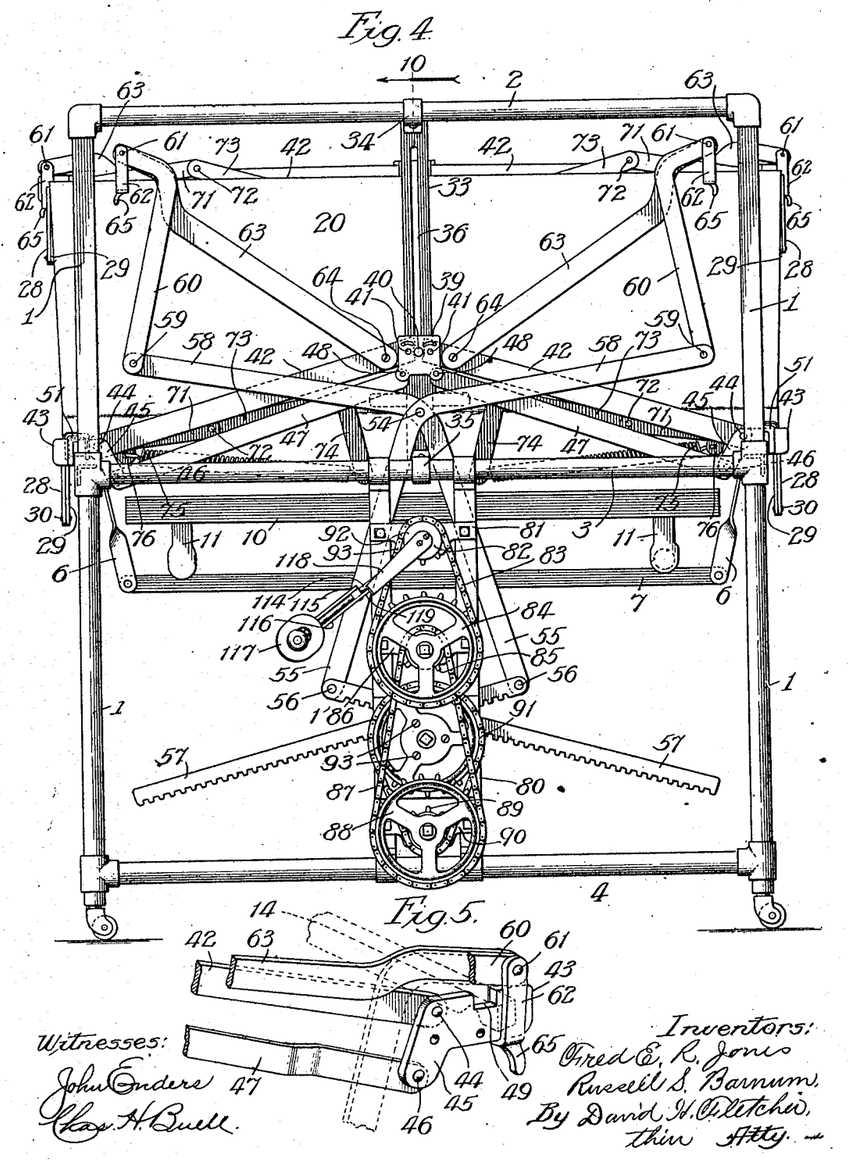
Fig. 4 is a rear elevation showing the rear end of the stretcher frame lowered and the forward end elevated.
Fig. 5 is an enlarged perspective view in detail showing parts of the stretching mechanism and the clamping device for connecting the lifting mechanism therewith.

We will now describe the means for supporting, spreading and lifting the channel-bars, the spreading action being intended to stretch the canvas preparatory to lifting it to avoid inconvenience to the patient. Located midway between the corner posts at the head and foot, respectively of the bed, is a vertical guide-bar 33, Figs. 1, 2, 3, 4, 6, 9, 10 and 11, which is rigidly attached at its respective ends by means of brackets 34 and 35 to the cross-bars 2 and 3. Each of said guide-bars is provided with a longitudinal slot 36. Loosely fitted upon each of the guide-bars 33 is a plate 37 having flanges 38, better shown in Figs. 9 and 11, which are adapted to fit the edges of said guide-bar so as to permit the plate to slide up and down thereon. Located upon the outside of each of the guide-bars is a plate 39 having a space between it and said guide-bar for the reception of intervening elements, as hereinafter stated, which plate is connected with the plate 37 by means of a bolt 40 which is projected loosely through the slot 36. The two plates are, therefore, combined to form a vertical sliding element which forms a pivotal anchorage for certain lifting, spreading, equalizing and restraining bars and elements by which to actuate and control the frame of the body supporting canvas. Pivotally connected to the inner face of each of the plates 39 at 41, 41, upon opposite sides of the bolt 40, are spreader bars 42, having short bent levers with horizontally extended arms 43, said levers being jointedly attached to the free ends thereof at 44. These features are shown in various figures, but more clearly illustrated in Fig. 5. The depending arms 45 of said levers are jointedly connected at 46 to equalizing bars 47, which are in turn jointedly connected at 48 to the plate 39. The laterally extended or horizontal lever-arms 43 are adapted to rest normally upon the bed rails 5, as indicated in Figs. 1 and 4, and the purpose of the equalizing bars is to maintain said arms in substantially horizontal planes at all times during the lifting operations, as hereinafter described. Each of the horizontal arms 43 is provided with a notch 49, better shown in Fig. 5, which is adapted to receive one of the telescoping or extension bars 14, which is notched upon its under face, as shown at 50, Figs. 12 and 18, to engage therewith. The canvas stretching and lifting frame, consisting of the telescoping movable side bars, is, therefore, supported at its ends upon the horizontal lever arms 43, and is intended to be manipulated through the action of said arms as they in turn are raised and lowered by means to be described. In order to insure a vertical movement of these parts and avoid lateral stress upon the spreader arms, we provide the following described guiding means. A bent arm 51 is rigidly attached to the horizontal arm of the lever 43, Figs. 1, 2, 3, 4, 9 and 11, having a friction roller 52 upon its end which enters a channel 53 formed in each of the corner posts and extending upwardly from the level of the side-rails to whatever height it may be found desirable to lift the canvas stretcher. These rollers serve as guides and cause the extension arms 14 to move in or out, as may be found necessary.

Figure 11:
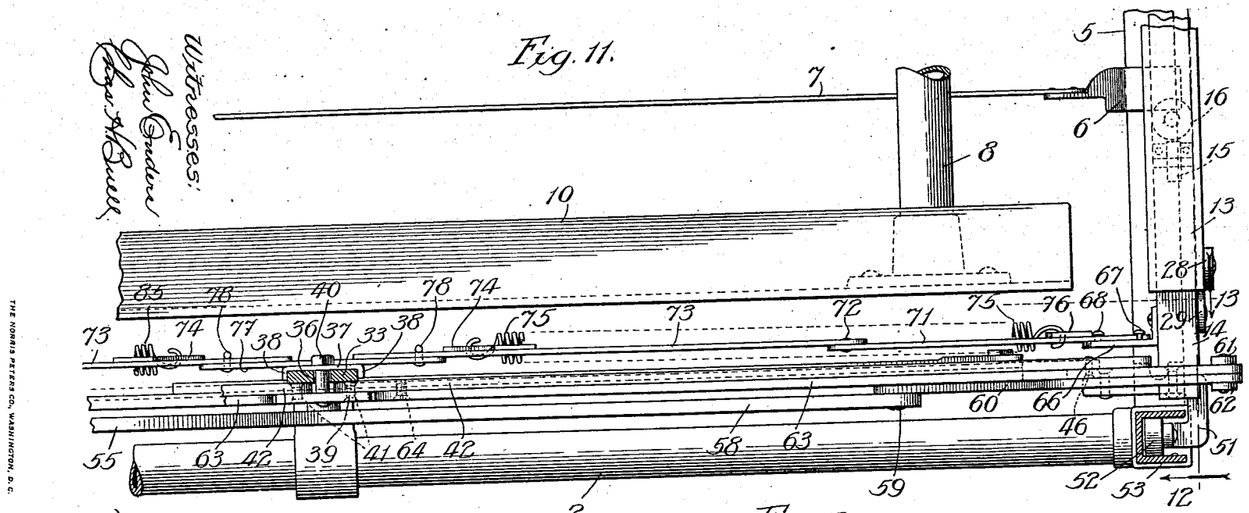
Fig. 11 is an enlarged sectional view in plan taken upon the line 11—11, Fig. 1.
Figure 12:
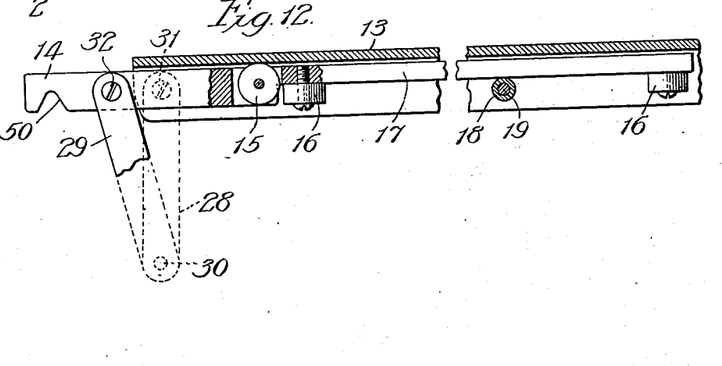
Fig. 12 is a vertical sectional view taken upon the line 12—, Fig. 11, viewed in the direction of the arrow there shown.
Figure 13:
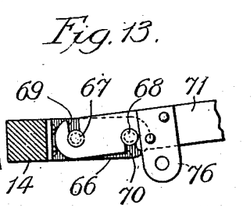
Fig. 13 is a sectional view taken upon the line 13—, Fig. 11, viewed in the direction of the arrow.

We will first describe the system of levers for lifting the frame and incidentally actuating the spreader-bars, after which we will describe the system of racks and gears for moving the levers. Pivoted at 54, Figures 1, 3, 4, 6 and 9, upon the lower portion of each of the guide-bars 33 at the respective ends of the bed, are operating levers having downwardly inclined arms 55, 55, respectively, the lower ends of which are jointedly connected at 56 to the ends of inclined rack-bars 57, which are inclined in reverse directions. The arms 58 of the bent levers controlled by said rack-bars, are jointedly connected at 59 to links 60, which latter are in turn respectively connected in like manner at 61 to loops 62. Controlling links 63 have their outer ends also connected at 61, while their inner ends are jointedly connected at 64 to the spreader-bars 42. Each of the loops 62 is provided with a depending lug or handle 65 to enable it to be operated. The parts are so adjusted that when in their respective normal positions, as shown in Fig. 1, said loops may be swung over the outer ends of the lever-arms 43, so as to engage and clasp them in the manner clearly indicated in Figs. 1 and 5 for the purpose of lifting the stretcher framework in any of the various ways hereinafter set forth. The spreader bars 42 act like a toggle joint to spread the channel bars 13 and stretch the canvas; but inasmuch as the canvas must be loose when in contact with the mattress 12, it follows that the spreader-bars upon opposite sides of the plate 39 must be inclined with respect to each other. This is accomplished by means of the bolt 40, which limits the downward movement of the plate 39, with which the bars are connected, by being brought into contact with the lower end of the slot 36, as shown in Fig. 1. As the arms 55 of the main actuating levers are drawn together, as hereinafter described, the arms 58 are lifted and acting through the links 60 and 63, lift the loops 62 and with them the parts 43, upon which the spreader bars are supported and to which the bars 42 are jointedly attached, thereby serving to lift the outer ends of said latter bars. The tension of the canvas, however, with the weight of a body upon it, tends to draw the bars 13 together as the outer ends of the spreader bars are raised, thereby tending to maintain said bars in downwardly and outwardly inclined planes and to lift the connecting plate 39. It is, therefore, essential to provide means for holding the meeting ends of the stretcher-bars down until the outer ends thereof are lifted, so that said bars may lie in a straight line with reference to each other and thereby spread the bars 13 apart and stretch the canvas attached thereto. This result may be accomplished by the following described means: Rigidly attached to the inner face of each of the extension bars 14, Figs. 11 and 13, is a bracket 66, the body of which is at right angles to the part 14 and is provided with projecting headed pins 67, 68, adapted to enter notches 69, 70, formed in the upper and lower edges, respectively, of oppositely disposed arms 71, also shown in Figs. 1, 2, 3 and 4. Each of said arms is jointedly connected at 72 with the outer end of a bar or lever 73 having a depending arm 74, the lower end of which is connected by means of a coiled spring 75 to a lug 76, better shown in Figs. 4, 11 and 13, upon the bar 71. A cross-bar 77, better shown in Figs. 1, 3, 9, 10 and 11, is rigidly attached to the lower end of the sliding plate 37, and is provided with hooks 78 near its outer ends, which are adapted to engage and serve as rests for the free ends of the levers 73, in a manner more clearly indicated in Figs. 3 and 11. The springs 75 being anchored as described, tend to pull outwardly in opposite directions upon the lower ends of the arms 74, thereby depressing the free ends of the levers 73 which are adapted to slide loosely upon the hooks 78 and to press downwardly thereon with sufficient force to overcome the tendency of the plate 39 to rise as a result of the inward pull of the canvas when the outer ends of the spreader-bars 42 are lifted. The inner ends of the spreader-bars being thus held down, it follows that when sufficient force is exerted upon the lifting levers to lift the parts 43, the plate 39 will remain stationary until the spreader bars upon opposite sides are brought into alinement with each other, at which time the meeting ends 79, Fig. 3ª, of the spreader-bars will have been brought together as indicated in dotted lines in Fig. 3, when said bars will remain in alinement until the stretcher is lifted to its full limit of movement and returned again to a level at which the bolt 40 is arrested in its descent by the lower end of the slot 36, when the lifting elements will continue to descend until the tension of the canvas is relaxed and it lies loosely upon the mattress.

Figure 2:
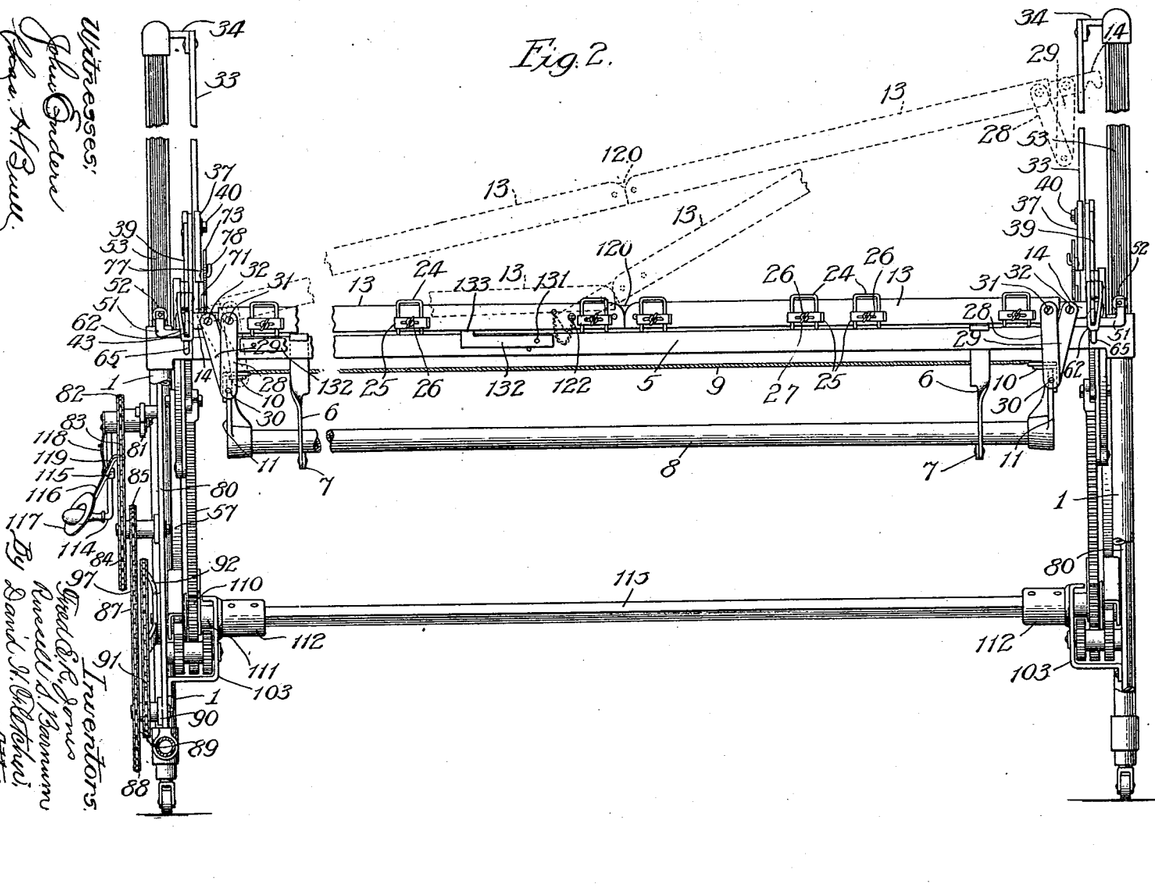
Fig. 2 is a side elevation in which the movable parts are shown in their respective normal positions, with varying positions of the canvas stretcher frame indicated in dotted lines.
Figures 14, 15, 16, 17:
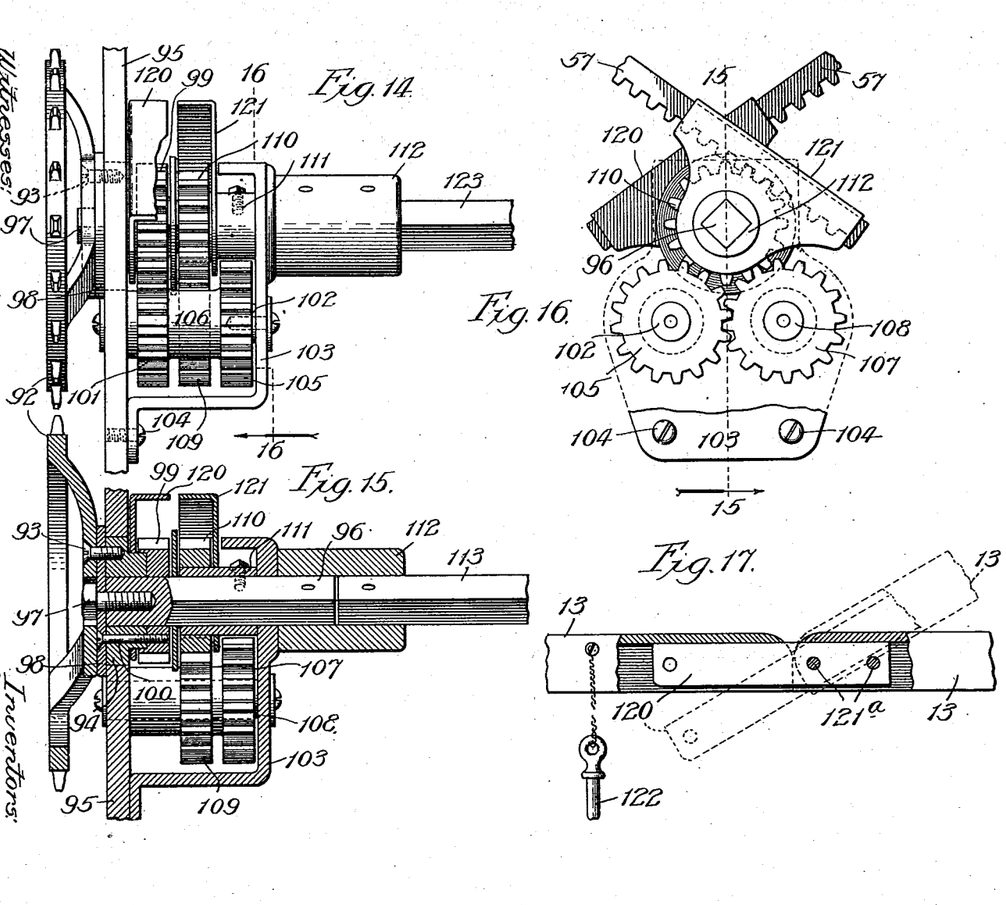
Fig. 14 is an enlarged view of the gears and other actuating mechanism viewed as indicated by the arrow from line 14—, Fig. 1.
Fig. 15 is a sectional view taken upon the line 15—15, Fig. 16, viewed as indicated by the arrow.
Fig. 16 is a rear face view of the driving gears and portions of the rack-bars.
Fig. 17 is a detail view of a part of the stretcher rail, a portion of which is sectioned to show the joint.

Before describing the manner in which the mechanism is manipulated in order to produce the various movements and positions required, we will describe the means for actuating the rack-bars 55 to move the lifting levers. Rigidly secured to the frame elements 3 and 4 at front and rear, are vertical bars 80, to one of which at the rear is attached a cross-bar 81 having a wrist-pin, upon which is journaled the hub of a small driving sprocket-wheel 82, connected by means of a sprocket chain 83, to a driven sprocket-wheel 84 having a small sprocket-wheel 85 upon its hub which is journaled upon a wrist-pin attached to a cross-bar 86. A chain 87 connects this sprocket-wheel with a larger sprocket-wheel 88 having a small one 89 upon its hub, which latter has its bearing upon a wrist-pin supported by a cross-bar 90. The wheel 89 is, in turn, connected by means of a chain 91 to a sprocket-wheel 92, secured by means of screws 93, better shown in Figs. 14 and 15 to a hub-like journal element 94, Fig. 15, having its bearing in a frame plate 95, Figs. 1, 14 and 15, attached to the bars 80. A short square shaft 96, is centrally projected through the hub 94 to rotate therewith and is held in place by means of a screw 97, and end-plate 98. A gear-wheel 99, Figs. 14 and 15, is mounted upon said shaft with which it rotates, being rigidly attached to the hub 94 by means of a screw 100. The gear 99, meshes into a gear 101, Fig. 14, journaled upon a stud 102 attached at one end to the plate 95 and at the other to a housing 103, also shown in Fig. 16, which is attached to said plate by means of screws 104. A gear 105 is formed in one piece with the gear 101 having an elongated hub 106 between the two and hence is adapted to rotate therewith. The gear 105 engages the teeth of a gear 107 upon a stud 108, Figs. 15 and 16, which stud is supported in the same manner as the stud 102. A gear 109, Figs. 14 and 15, is rigidly formed upon the same hub with the gear 107 so as to rotate therewith, and is caused to mesh, in turn, with an annular gear 110, loosely mounted upon a stationary sleeve 111 upon the short shaft 96. A sleeve 112 is connected with the shaft 96 and serves as a detachable coupling for connecting with a long shaft 113 which extends to the opposite end of the bed, as shown in Fig. 2, and serves to connect with a set of gears corresponding in every respect with those above described, so that motion imparted to one set will be communicated to the other to provide a corresponding action at both ends.

The gear mechanism is operated by means of a crank 114 which is adapted to be locked against a reverse movement as a possible result of the weight upon the stretcher when the latter is raised, by means of the following stop mechanism: Pivoted upon the crank-arm at a point 115 between its ends, Figs. 1 to 4 inclusive, is a lever 116, the outer end of which is attached to a perforated plate 117 through which the handle of the crank arm is projected. A weak spring 118 tends to move the short end 119 of the lever into the path of the sprocket-chain 83. When the operator grasps the handle he pushes his hand laterally against the plate 117, thereby throwing the short end of the lever out of the chain-path and it is so held as long as he retains his hold upon the handle, so that the crank may be freely operated; but as soon as it is released the spring acts to throw the arm 119 into the path of the chain, thereby preventing a backward movement of the crank and holding the stretcher in its raised position.

The teeth of one of the rack-bars 57 are in mesh with those of the gear 109, while those of the other are arranged to engage the teeth of the loose gear 110. The train of gears is so arranged as to cause the gears 99 and 110 to be rotated in opposite directions, thereby moving the racks 57 accordingly to draw the lever-arms 55 together so as to lift the stretcher frame as shown in Fig. 3, or to lower the same by separating said members as shown in Fig. 1. Housings 120, 121 are loosely mounted upon the hub of the part 94 and the sleeve 111, respectively, as clearly shown in Figs. 14 to 16, inclusive, to hold the rack-bars 57 in engagement with the respective gears while permitting the angle of inclination of each bar to be varied to meet the requirements thereof.

We will now explain the operation of the mechanism so far described, after which we will describe certain novel features adapted to be used in conjunction therewith. Should it be desirable merely to raise the patient in a horizontal plane, from the normal position shown in Fig. 1, the operator first connects all of the loops 62 at the four corners of the bed to the parts 43. The turning of the crank to the right serves, through the action of the oppositely disposed rack-bars at the respective ends of the bed to draw the lever arms 55 together and thus, through the combined action of said levers, and that of the links 60 and 63, a simultaneous lifting action is exerted upon the parts 43 at the several corners of the bed. As this lifting action occurs, the compensating bars 47 so govern the movement of the lower ends of the lever arms 45, as to cause the arms 43 to maintain substantially horizontal positions as they ascend. The spreading action of the bars 42, as well as that of the levers 73 and springs 75, has already been described. The respective positions of the parts when the stretcher frame is raised to its full height in a horizontal plane are indicated in Figs. 3 and 9. Should it be desirable to elevate one end only of the stretcher frame, as, for example, the front, it may be accomplished by disconnecting the two loops 62 at the opposite end, when, upon turning the crank, the forward end of the stretcher frame will be lifted as indicated in dotted lines in Fig. 2 and shown in full lines in Fig. 4. In each case the lifting elements 58, 60 and 63 will take the respective positions represented in Fig. 4. It is obvious that the incline of the stretcher frame may be reversed from that indicated in Fig. 2 by disengaging the loops at the front end and connecting those at the rear.

Figure 6:
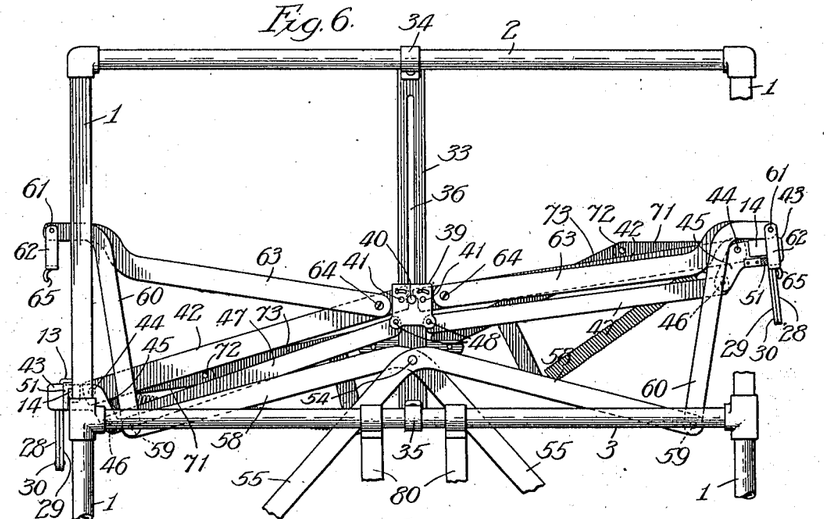
Fig. 6 is a rear elevation showing the respective positions assumed by the parts when the stretcher frame is tilted laterally.

It frequently becomes desirable to tilt the stretcher laterally in order to enable a patient to be turned over without handling. This may be readily accomplished by connecting the loops at each end of the bed upon the side which is to be elevated and disconnecting those upon the opposite side; when, upon turning the crank, the parts will assume the positions respectively as indicated in Fig. 6. The four movements or inclinations described contemplate the movement of the stretcher frame as a whole. Two additional movements or positions may be insured by jointing the bars 13 between the ends as indicated in Figs. 2 and 17. This may be accomplished by making the channel-bars in two parts and connecting them by means of a bar 120, one end of which is bolted or riveted to one bar as shown at 121$^a$, Fig. 17, while the other end may be detachably connected by means of a pin 122. Upon detaching the loops at the rear of the bed and removing the pins 122, the forward or head portion of the stretcher-frame may be elevated as indicated in dotted lines in Fig. 2, or the foot portion may be raised while the head remains level by merely disconnecting the loops at the head and connecting those at the foot. By connecting all of the loops and removing the pins 122, both the head and foot portions may be raised, leaving the middle portion at its normal level. It is obvious that the telescoping extension bars 14 would not be needed were the stretcher frame to be raised and lowered only in a horizontal plane; but in order to provide for the several inclined positions, they are essential.

Figure 7:
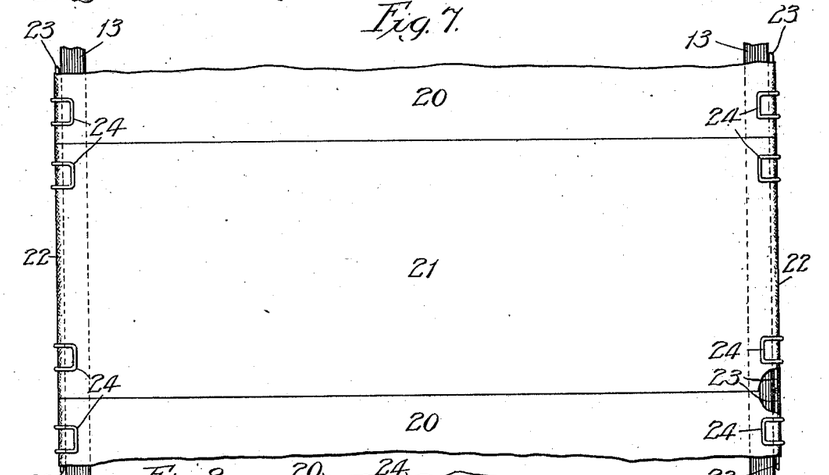
Fig. 7 is a plan view of the middle portion of the stretcher bars showing sections of canvas connected therewith.
Figure 8:
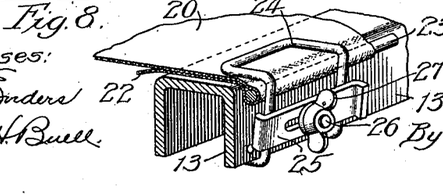
Fig. 8 is a perspective of a portion of one of the stretcher rails illustrating the manner of clamping a section of canvas thereto.

In Fig. 7 we have shown the middle section 21 of the canvas support as overlapping the two adjacent sections. This arrangement enables it to be removed without disturbing the others. In Fig. 18 the stretcher frame is represented as elevated above the mattress 12, while the section 21 is removed. Inclined supports 123 are removably secured in sockets 124 attached to the channel bars 13 opposite the canvas section 20. Said supports are preferably made of sheet metal in tubular form to provide for the insertion of the upper ends of bent telescoping extensions 125. A canvas strip 126 has its ends attached to the supports 123 so as to enable it to be rolled thereon until it is under sufficient tension to form a back support for the patient when sitting upon the strip 20 and resting his feet upon the mattress 12. A narrower strip 127 has its ends rolled upon the extensions 125 to form a head-rest. The ends of the strips may be secured by means of semitubular spring clips 128, Fig. 21, when they may be wound thereover to any desired extent to secure the necessary adjustment. In order to form a top support for the parts 123 and 125 we provide a bar 129, Figs. 18 and 19, having pintles 130, Fig. 19, upon its ends, adapted to enter the hollow upper ends of the parts 125 and thus form a separating brace to resist the tension of the canvas elements 126 and 127.

Figures 22, 23:
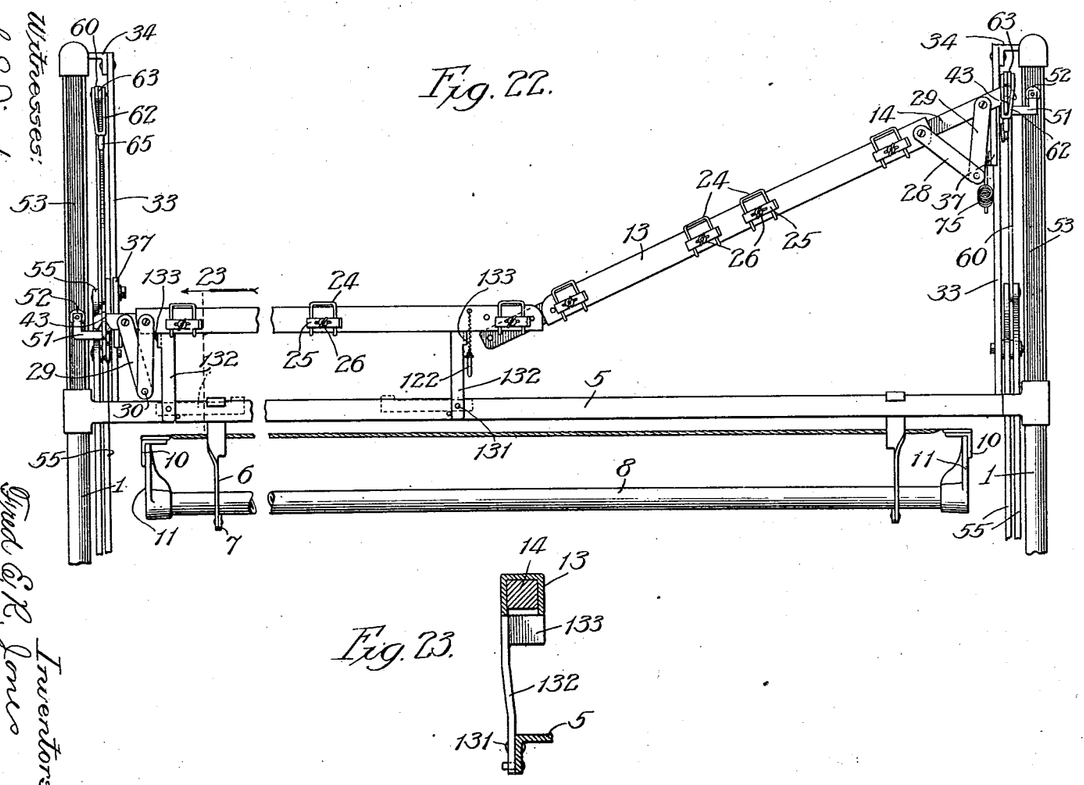
Fig. 22 is a side elevation showing the rear portions of the stretcher rails elevated horizontally and the forward parts inclined.
Fig. 23 is a section upon the line 23—, Fig. 22.

For certain purposes, obvious to the practical nurse, it is desirable to raise the main body of the stretcher-frame for a considerable distance above the level of the mattress and to support the same in a horizontal position while the forward portion thereof is raised to an inclined position with the head end at a much greater height, as shown in Fig. 22. Inasmuch as the main actuating levers 58, in front and rear, are operated in unison through the action of the connecting shaft 113, it follows that as long as the loops 62 at both ends are connected, the opposite ends of the stretcher frame will both be raised or lowered. If, therefore, one portion is to be partially raised and the other lifted still higher, it follows that means must be provided for independently supporting the former to permit the loops at the rear end to be disconnected so that a further movement of the crank may cause the continued lifting of the forward end after the locking pins 122 are removed from the jointed connection. This result may be accomplished as follows: Jointedly connected to each of the side-rails 5 at 131, are brackets 132 formed from angle irons, which are adapted to fold upon said rails with a flange 133 arranged to normally overlie and rest upon the rails. When, however, the stretcher-frame is lifted above the rails 5 to a height corresponding to the length of said brackets, the latter may be moved into upright positions, as shown in said Fig. 22 and the stretcher frame allowed to rest upon the parts 133. The links 62 at the foot of the bed may then be disconnected and the pins 122 removed, when, upon turning the crank 114, the forward section of the stretcher-frame may be tilted to any desired angle of inclination.

It will be apparent to those skilled in handling the sick, that the importance of the several novel movements obtainable by means of our improvements, are too obvious to require special mention.

We do not wish to be confined to the specific construction shown, inasmuch as it may be varied in numerous ways without departing from the principles involved.

Having thus described our invention, we claim:

1. The combination with a stationary bed, of a stretcher-frame mounted thereon, said frame having a normally loose fabric attached thereto to overlie the bed proper, means for placing said fabric under tension when the frame is elevated, and means for elevating one end of said frame while the other remains at normal level.

2. The combination with a stationary bed, of a superposed stretcher-frame comprising movable side-rails connected by a normally loose fabric, said rails having joints therein near the middle, means for locking said joints to render the rails normally rigid, means for spreading said rails to stretch said fabric when an end of the frame is lifted, and means for lifting an end of said frame.

3. The combination with a stationary bed, of a superposed stretcher-frame for supporting a fabric over the bed, extensible frame supporting elements at the several corners of said frame to allow for the requisite extension when said frame is tilted, and means for lifting any predetermined pair of said extensible elements.

4. The combination with a stationary bed, of a superposed stretcher-frame comprising longitudinal side-rails, a fabric for connecting said rails, telescoping end-pieces connected to each of said rails, movable supporting elements for supporting said end pieces, spreading elements for spreading said rails to place said fabric under tension, and means for simultaneously actuating said supporting and spreading elements.

5. The combination with a stationary bed, of a superposed stretcher-frame comprising parallel side-rails for supporting a fabric mounted thereon, telescoping extension elements connected with the ends of each of said rails, movable supports for supporting said extension elements, means for lifting said movable supports, and means for guiding said supports vertically.

6. The combination with a stationary bed, of a stretcher-frame, a fabric mounted thereon, movable supporting elements located at each corner of the bed in operative connection with said frame, oppositely extended arms forming toggle-joints, jointedly connected to said supporting elements, equalizing elements for maintaining said supporting elements in substantially horizontal positions when actuated, a series of levers for lifting said supporting elements, and means for actuating said levers in unison.

7. The combination with a stationary bed, of a stretcher-frame having a fabric mounted thereon, movable supporting elements therefor located at the respective corners, toggle-joints at opposite ends of the bed in connection with said supporting elements for spreading the same when lifted, and means detachably connected with said supporting elements for lifting the same.

8. The combination with a stationary bed, of a stretcher-frame having a fabric mounted thereon, movable supporting elements for said frame located at the respective corners, toggle-joints at opposite ends of the bed in jointed connection with said supporting elements for spreading the same when lifted, oppositely disposed levers pivoted at corresponding points at the head and foot of the bed for lifting said supporting elements, means for detachably connecting the same therewith, means for moving the free ends of each set of levers in opposite directions with respect to each other, a source of power, and means for connecting both sets of levers therewith to cause them to be actuated in unison.

9. In a device of the class described, the combination with a stretcher-frame having laterally movable rails for supporting an intervening fabric, of means for spreading said rails, means for lifting any two consecutive corners thereof, and means for actuating said spreading and lifting means at the same time.

10. In a device of the class described, the combination with a stretcher-frame having laterally movable rails for supporting an intervening fabric, means for spreading said rails, means for simultaneously lifting any two consecutive corners thereof, spreading mechanism, and means for connecting said lifting and spreading mechanism to a common source of power.

11. In a device of the class described, the combination with a stretcher-frame having laterally movable rails for supporting an intervening fabric, of a normally loose fabric mounted thereon, toggle-joints at each end of the bed for moving said rails laterally, frame supporting elbow-levers attached to said toggle-joints at the respective corners of the bed, one arm of each of which is in operative connection with said frame, equalizing bars connected respectively with a stationary point and with the opposite end of one of said levers, lifting levers, means for detachably connecting the same with the supporting ends of said supporting levers, and means for actuating said lifting levers.

12. The combination with a stationary bed of a superposed stretcher frame, comprising side-rails having a normally loose fabric attached thereto to overlie the bed proper, said rails being provided with joints between the ends, means for locking said joints to render the rails rigid, means for raising said frame, means for independently supporting a section of said frame from said joints rearwardly, and means for raising the forward end when said joints are unlocked.

In testimony whereof, we have signed this specification in the presence of two subscribing witnesses, this 25th day of February 1910.

FRED E. R. JONES.
RUSSELL S. BARNUM.

Witnesses:
DAVID H. FLETCHER,
CARRIE E. JORDAN.